US012741502B2

(12) United States Patent
Tissot et al.

(10) Patent No.: US 12,741,502 B2
(45) Date of Patent: Sep. 22, 2026

(54) HEAT EXCHANGER FOR A MOTOR VEHICLE

(71) Applicant: Valeo Systemes Thermiques, Le Mesnil-Saint-Denis (FR)

(72) Inventors: Julien Tissot, Le Mesnil-Saint-Denis (FR); Kamel Azzouz, Le Mesnil-Saint-Denis (FR); Gael Durbecq, Le Mesnil-Saint-Denis (FR); Moussa Nacer Bey, Le Mesnil-Saint-Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 332 days.

(21) Appl. No.: 18/575,310

(22) PCT Filed: Jun. 14, 2022

(86) PCT No.: PCT/EP2022/066228
§ 371 (c)(1),
(2) Date: Dec. 29, 2023

(87) PCT Pub. No.: WO2023/274722
PCT Pub. Date: Jan. 5, 2023

(65) Prior Publication Data

US 2024/0326548 A1 Oct. 3, 2024

(30) Foreign Application Priority Data

Jun. 29, 2021 (FR) ....................................... 2107002

(51) Int. Cl.

| | |
|---|---|
| ***B60H 1/00*** | (2006.01) |
| ***F28F 3/04*** | (2006.01) |
| ***F28F 9/02*** | (2006.01) |

(52) U.S. Cl.
CPC ......... *B60H 1/00342* (2013.01); *F28F 3/046* (2013.01); *F28F 9/0253* (2013.01)

(58) Field of Classification Search
CPC ........ F28F 3/00; F28F 3/02; F28F 3/04; F28F 3/042; F28F 3/046; B60H 1/00342
(Continued)

(56) References Cited

U.S. PATENT DOCUMENTS

| | | | | |
|---|---|---|---|---|
| 9,448,013 B2 * | 9/2016 | Ito | F28F 3/046 | |
| 2006/0053833 A1 * | 3/2006 | Martins | F25B 39/04 | 62/507 |

(Continued)

FOREIGN PATENT DOCUMENTS

| | | |
|---|---|---|
| CN | 103495330 A | 1/2014 |
| CN | 104620064 A | 5/2015 |

(Continued)

OTHER PUBLICATIONS

International Search Report issued in corresponding International Application No. PCT/EP2022/066228 mailed Aug. 26, 2022 (5 pages).

(Continued)

*Primary Examiner* — Claire E Rojohn, III
(74) *Attorney, Agent, or Firm* — Osha Bergman Watanabe & Burton LLP

(57) ABSTRACT

A heat exchanger for a motor vehicle is disclosed. The heat exchanger includes a first circuit configured to be traversed by a heat-transfer fluid. The first circuit includes a fires inlet header through which the heat-transfer fluid is admitted into the first circuit, and a first outlet header through which the heat-transfer fluid leaves the first circuit. The heat exchanger also includes a second circuit configured to be traversed by a heat-transfer fluid. The second circuit is fluidically separate from the first circuit and includes a second inlet header (Continued)

and a second outlet header. The heat-transfer fluid is admitted into the heat exchanger through the second inlet header and leaves through the second outlet header. The first circuit or second circuit includes an additional header that extends in the same direction as the inlet headers and outlet headers of the first circuit and the second circuit.

8 Claims, 5 Drawing Sheets

(58) Field of Classification Search
USPC .................................................. 165/166, 167
See application file for complete search history.

(56) References Cited

U.S. PATENT DOCUMENTS

| | | | | |
|---|---|---|---|---|
| 2007/0125527 | A1* | 6/2007 | Flik | F28D 7/1692 165/140 |
| 2016/0327318 | A1* | 11/2016 | Kim | B60H 1/00342 |
| 2018/0128551 | A1* | 5/2018 | Merel | F28D 9/0093 |
| 2020/0006822 | A1* | 1/2020 | Shisler | F28D 9/0056 |
| 2021/0095927 | A1* | 4/2021 | Yang | F28F 9/0275 |
| 2021/0396475 | A1* | 12/2021 | Tissot | F28D 9/005 |
| 2021/0396479 | A1* | 12/2021 | Tissot | F28F 3/046 |
| 2022/0011061 | A1* | 1/2022 | Azzouz | F28D 9/005 |
| 2022/0099379 | A1* | 3/2022 | Romlund | F28F 9/028 |
| 2023/0003458 | A1* | 1/2023 | Azzouz | F28D 9/005 |
| 2023/0061944 | A1* | 3/2023 | Romlund | F28F 3/046 |
| 2023/0288146 | A1* | 9/2023 | Durbecq | F28F 9/0256 |
| 2024/0295365 | A1* | 9/2024 | Tissot | F28D 9/0093 |
| 2024/0326548 | A1* | 10/2024 | Tissot | B60H 1/00342 |
| 2024/0367479 | A1* | 11/2024 | Tissot | B60H 1/00342 |
| 2024/0399836 | A1* | 12/2024 | Tissot | F25B 39/00 |
| 2025/0027722 | A1* | 1/2025 | Tissot | H05K 7/20872 |
| 2025/0189236 | A1* | 6/2025 | Tissot | F28D 9/0062 |
| 2025/0305778 | A1* | 10/2025 | Nacer-Bey | B60H 1/00485 |
| 2025/0362065 | A1* | 11/2025 | Nacer-Bey | B60H 1/00342 |

FOREIGN PATENT DOCUMENTS

| | | | |
|---|---|---|---|
| CN | 105579725 | A | 5/2016 |
| WO | 2015/043531 | A1 | 4/2015 |

OTHER PUBLICATIONS

Written Opinion issued in corresponding International Application No. PCT/EP2022/066228 mailed Aug. 26, 2022 (6 pages).

Office Action issued in corresponding European Application No. 22733123.8, dated Dec. 20, 2024. (5 Pages).

Office Action issued by the CNIPA for corresponding Chinese Patent Application No. 202280052474.3, mailed May 29, 2026 (12 pages).

* cited by examiner

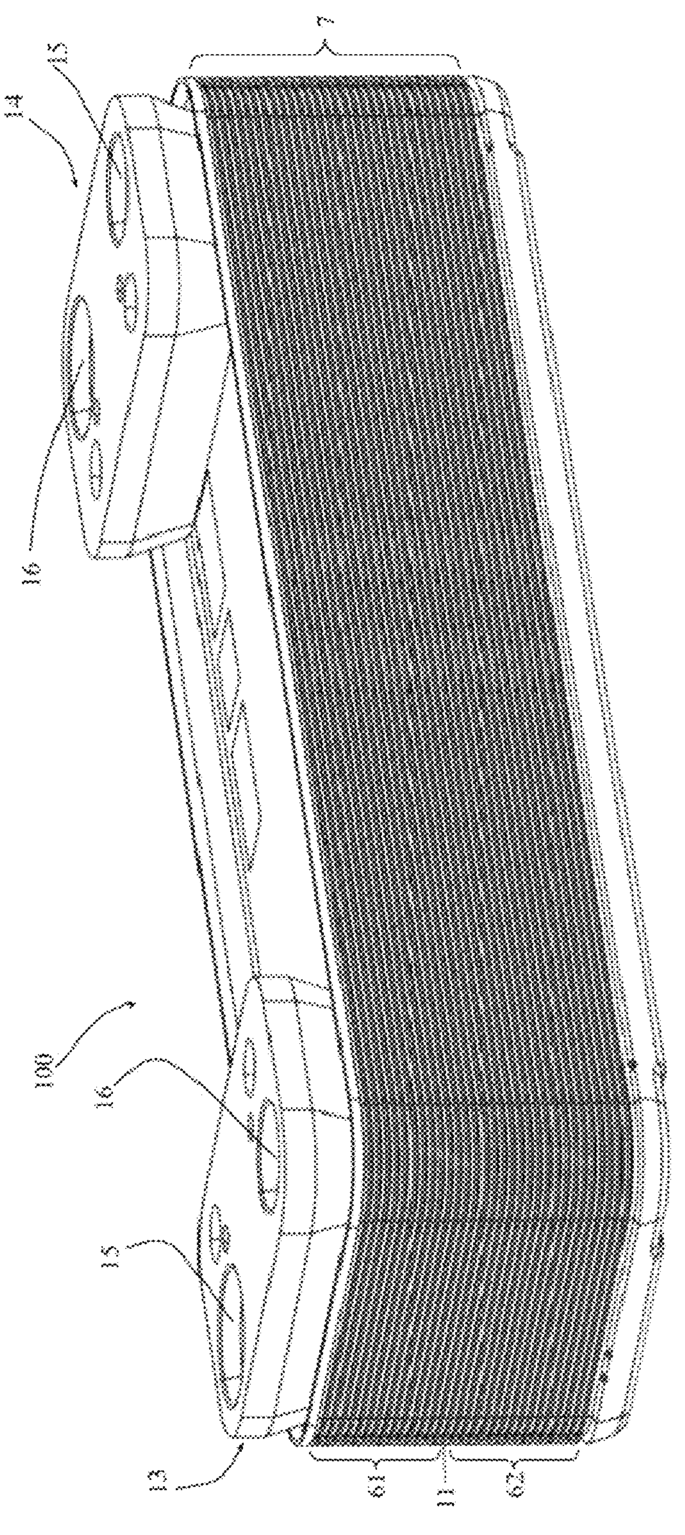
[Fig. 1]

[Fig.2]
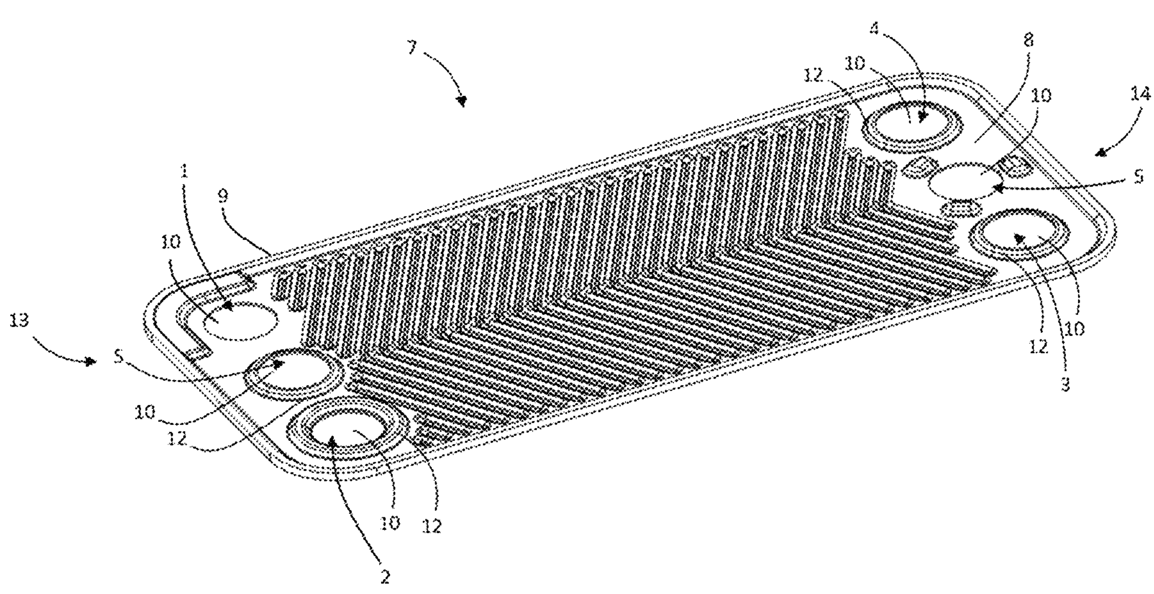

[Fig.3]
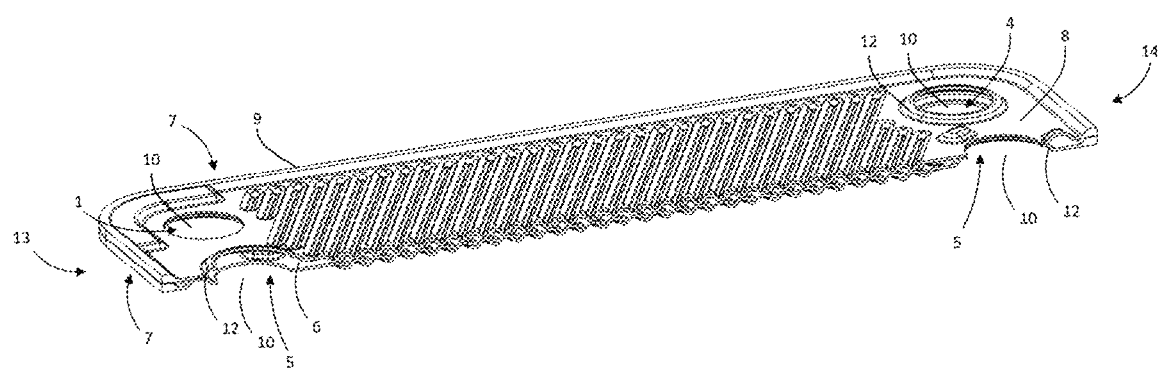

[Fig.4]
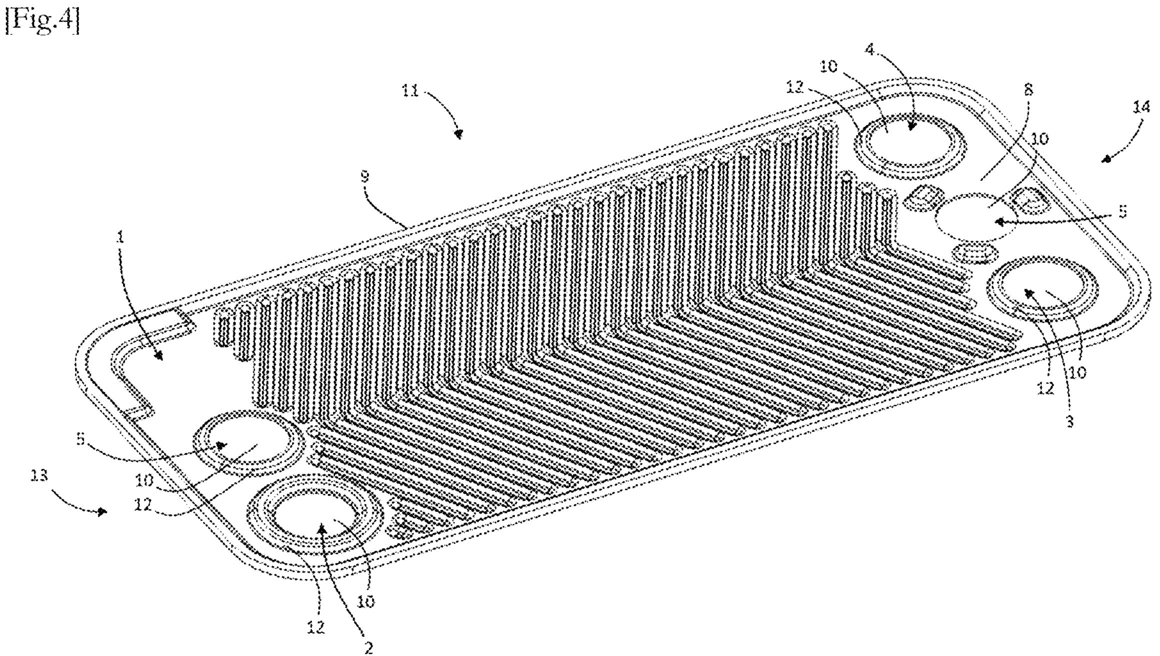

[Fig.5]

HEAT EXCHANGER FOR A MOTOR VEHICLE

TECHNICAL FIELD

The present invention relates to the field of heat exchangers for motor vehicles. The invention applies preferably, although not exclusively, to the heat exchangers used in the air conditioning circuits of such vehicles.

PRIOR ART

The present invention more particularly relates to heat exchangers that comprise a first circuit configured to carry a refrigerant fluid and a second circuit configured to carry a heat-transfer liquid. More specifically, such an exchanger, when used as a condenser, usually comprises three passes for the first refrigerant circuit and a single pass for the second heat-transfer liquid circuit. In order to improve thermal performance, a counter-current flow is used in the first and third passes, where the refrigerant is mainly single-phase, and a co-current flow is used where the refrigerant is mainly two-phase to obtain a good exchange coefficient. When the vehicle air conditioning is being used in conditioned-air mode, the heat exchanger is not used. There are then two options: either to entirely bypass the heat exchanger using valves, or to circulate the refrigerant fluid inside the heat exchanger without circulating the heat-transfer liquid of the second circuit therein, so that no heat is delivered to the heater core. The second solution has the advantage of being less costly than the first solution, but has the drawback of worsening the coefficient of performance of the air conditioning. This is because performance of the system is diminished as a result of the pressure loss caused by the three passes of the heat exchanger.

The present invention is intended to provide a reduction in pressure loss in at least one of the circuits, while providing a heat exchanger that is easy to assemble and less bulky.

SUMMARY OF THE INVENTION

The present invention therefore relates to a heat exchanger for a motor vehicle, comprising:

- a first circuit intended to be traversed by a heat-transfer fluid, comprising a first inlet header through which the heat-transfer fluid is admitted into the first circuit and a first outlet header through which the heat-transfer fluid leaves the first circuit,
- a second circuit intended to be traversed by a heat-transfer fluid, that is fluidically separate from the first circuit and comprises a second inlet header through which the heat-transfer fluid is admitted into the heat exchanger and a second outlet header through which the heat-transfer fluid leaves the heat exchanger, characterized in that at least the first circuit or the second circuit comprises an additional header that extends in the same direction as the inlet headers and outlet headers of the first circuit and the second circuit, and that is separate from these headers.

According to one of the aspects of the invention, each of the circuits comprises a plurality of chambers linked fluidically to the inlet headers and outlet headers of either the first circuit or the second circuit.

According to one of the aspects of the invention, each chamber is delimited by at least two plates, each plate comprising a bottom wall surrounded by a raised edge, the bottom wall having one opening per header that at least partially delimits each inlet header or outlet header or additional header, the two plates being arranged one inside the other.

According to one of the aspects of the invention, the bottom walls of the plates delimiting the chambers of the first circuit or the second circuit have a substantially flat overall shape. The heat exchanger according to the invention is therefore made up of a stack of plates as described above arranged in a stacking direction substantially perpendicular to an overall main direction of extension of the bottom wall of each of these plates. This has the effect that each of the aforementioned inlet or outlet headers is formed by stacking the aforementioned openings formed in the bottom walls of the plates delimiting the chambers of the first circuit or of the second circuit. Each inlet or outlet header for the heat-transfer fluid of the first circuit or the second circuit of the exchanger according to the invention therefore substantially takes the form of a conduit extending through the heat exchanger according to the invention.

According to one of the aspects of the invention, the openings formed in the bottom walls of the plates that make up the heat exchanger according to the invention are arranged in such a way that each of the aforementioned inlet or outlet headers extends substantially perpendicular to the bottom walls of the plates that delimit the chambers of the first circuit or of the second circuit, and therefore substantially parallel to the stacking direction of the aforementioned plates.

According to one of the aspects of the invention, the heat exchanger comprises a first group of chambers and a second group of chambers, the first group of chambers being separated from the second group of chambers by at least one deflecting plate intended to force the fluid of at least the first circuit or the second circuit to flow in a first flow direction in the first group of chambers and to force the fluid to flow in a second flow direction in the second group of chambers.

According to one of the aspects of the invention, the first and second group of chambers have one and the same number of plates.

According to one of the aspects of the invention, the at least one deflecting plate comprises a bottom wall with no opening in the first inlet header or the second inlet header, depending on the circuit intended to have a second flow direction of the fluid.

According to one of the aspects of the invention, the first circuit and the second circuit each comprise an additional header.

According to one of the aspects of the invention, the heat exchanger comprises two deflecting plates, enabling a second flow direction to be provided for the fluid of the first circuit and the second circuit.

According to one of the aspects of the invention, the bottom walls of the plates in the first group of chambers delimiting the chambers of the first circuit or of the second circuit comprise a sealing rim that surrounds each opening of the second circuit or of the first circuit, as well as the openings of the first outlet header or of the second outlet header.

According to one of the aspects of the invention, the bottom walls of the plates of the second group of chambers delimiting the chambers of the first circuit or of the second circuit comprise a sealing rim that surrounds each opening of the second circuit or of the first circuit, as well as the openings of the first inlet header or of the second inlet header.

According to one of the aspects of the invention, the plates in the first group of chambers and in the second group of chambers alternate between the first circuit and the second circuit.

This helps to maximize the heat exchange coefficient between the heat-transfer fluid of the first circuit and the heat-transfer fluid of the second circuit.

According to one of the aspects of the invention, each sealing rim is in contact with a second plate of the second circuit if the rim is positioned on a plate dedicated to the first circuit, and conversely is in contact with a second plate of the first circuit if the rim is positioned on a plate dedicated to the second circuit.

According to one of the aspects of the invention, the first inlet header and the first outlet header of the first circuit are arranged at one and the same first longitudinal end of the heat exchanger. This has the advantage of circulating the heat-transfer fluid of the first circuit in one and the same direction in the chambers intended for the first circuit in each group of chambers.

According to one of the aspects of the invention, the second inlet header and the second outlet header of the second circuit are arranged at a second longitudinal end of the heat exchanger, opposite the first longitudinal end. This has the advantage of circulating the heat-transfer fluid of the first circuit and of the second circuit in one and the same group of chambers in opposite directions, thereby establishing a good heat exchange coefficient between the two circuits. This also has the advantage of circulating the heat-transfer fluid of the second circuit in one and the same direction in the chambers intended for the second circuit in each group of chambers.

According to one of the aspects of the invention, the additional header is positioned at the longitudinal end opposite the inlet header and the outlet header to which it is fluidically linked.

According to one of the aspects of the invention, the headers arranged at one and the same longitudinal end of the heat exchanger are arranged on one and the same straight line.

According to one of the aspects of the invention, the inlet headers of the first and second circuits each comprise a supply channel intended to supply heat-transfer fluid to the first circuit or the second circuit respectively.

According to one of the aspects of the invention, the outlet headers of the first and second circuits each comprise an outlet channel intended to drain heat-transfer fluid from the first circuit or the second circuit respectively.

According to one of the aspects of the invention, the supply channels and the outlet channels are positioned on one and the same face of the heat exchanger. This has the advantage of bringing all of the manifolds of the first and second circuits together on one and the same side of the heat exchanger, thereby reducing the size of the heat exchanger and simplifying installation thereof in the vehicle.

According to one of the aspects of the invention, the openings of each header are of the same size. However, in an alternative, the invention also enables simple means, such as making openings of different sizes in the plates of the first group of chambers compared to the openings in the plates of the second group of chambers, to be used to modify the flow rate of heat-transfer fluid inside such an exchanger, for an increased or reduced residence time in the first flow direction of the fluid or in the second flow direction of the fluid, thereby improving the efficiency of the heat exchange.

According to one of the aspects of the invention, the additional header of the first circuit is arranged between the second inlet header and the second outlet header of the second circuit.

According to one of the aspects of the invention, the additional header of the second circuit is arranged between the first inlet header and the first outlet header of the first circuit. This has the advantage of providing plates of identical shape for each group of chambers, the plates intended for the second circuit being simply pivoted through 180° in relation to the plates of the first circuit when mounted during assembly. This greatly facilitates assembly of the plates and also advantageously makes it possible to reduce the number of different references and thereby reduce the tooling costs related to the construction of the heat exchanger. Identical shape relates to shapes having an active role in the invention, and does not apply to non-essential shapes.

Alternatively, according to another aspect of the invention, the additional header of the first circuit may be arranged on the extension of a straight line passing through the second inlet header and the second outlet header of the second circuit.

Similarly, according of one of the aspects of the invention, the additional header of the second circuit may be arranged on the extension of a straight line passing through the first inlet header and the first outlet header of the first circuit.

According to one of the aspects of the invention, the heat-transfer fluid flowing through the first circuit or the second circuit may be a fluid in gas phase or liquid phase when flowing through the heat exchanger. The heat-transfer fluid may also be present in one chamber in a phase different from another chamber.

According to one example embodiment, the heat-transfer fluid of the first circuit is a refrigerant fluid and the heat-transfer fluid of the second circuit is glycol water.

According to another example embodiment, the heat-transfer fluid of the first circuit and the heat-transfer fluid of the second circuit may be the same fluid, but in different phases when flowing through the heat exchanger.

The invention also relates to use of the heat exchanger described in this document as a condenser. During such use, the first group of chambers is a condensation zone for the refrigerant fluid and the second group of chambers is a supercooling zone for the refrigerant fluid. In such exchangers, also known as water-cooled condensers, the refrigerant fluid is admitted in a first flow direction of the fluid of the first circuit in gas form, then circulates in the second flow direction of the fluid of the first circuit, in contact with the different groups of chambers of the second circuit through which the heat-transfer liquid circulates, and is gradually condensed before leaving the exchanger in liquid form.

BRIEF DESCRIPTION OF THE DRAWINGS

Further features, details and advantages of the invention will become more clearly apparent from reading the description given below by way of indication with reference to the drawings in which:

FIG. 1 is a schematic overview of an example embodiment of the heat exchanger according to the invention, FIG. 2 is a schematic view of a plate intended for the first circuit of the heat exchanger in FIG. 1 showing a first embodiment of the invention, FIG. 3 is a schematic view in section in a vertical and transverse plane of a chamber comprising two plates of the heat exchanger of FIG. 1 according to a first embodiment of the invention, FIG. 4 is a schematic view of a deflecting plate of the first circuit of the heat exchanger in FIG. 1 according to a first embodiment of the invention, FIG. 5 is a schematic exploded view of the circuits of the heat exchanger in FIG. 1 according to a first embodiment of the invention.

It should first of all be noted that although the figures set out the invention in detail for implementing the invention, these figures may of course be used in order to better define the invention if necessary. It should also be noted that these figures set out only some example embodiments of the invention.

DETAILED DESCRIPTION

Figure 5:
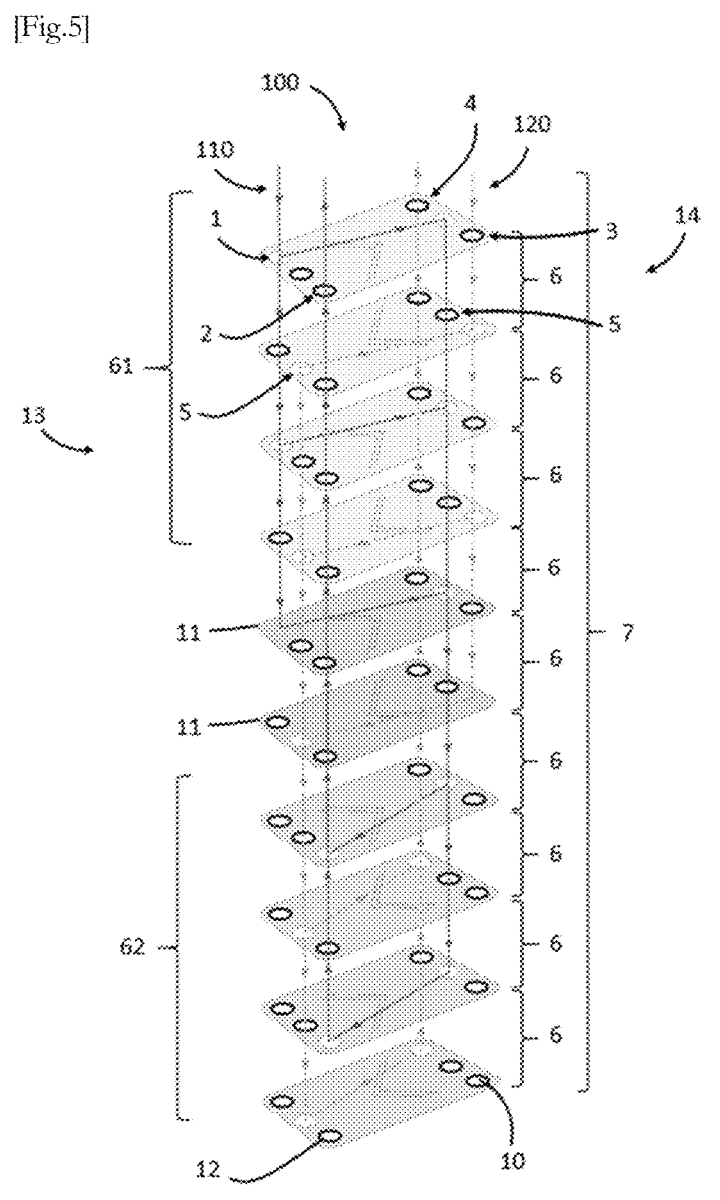

FIGS. 1 and 5 are schematic views, perspective and exploded, of a heat exchanger 100 according to the invention, comprising:

- a first circuit 110 intended to be traversed by a heat-transfer fluid, comprising a first inlet header 1 through which the heat-transfer fluid is admitted into the first circuit 110 and a first outlet header 2 through which the heat-transfer fluid leaves the first circuit 110,
- a second circuit 120 intended to be traversed by a heat-transfer fluid, that is fluidically separate from the first circuit 110 and comprises a second inlet header 3 through which the heat-transfer fluid is admitted into the heat exchanger 100 and a second outlet header 4 through which the heat-transfer fluid leaves the heat exchanger 100, characterized in that at least the first circuit 110 or the second circuit 120 comprises an additional header 5 that extends in the same direction as the inlet headers 1, 3 and outlet headers 2, 4 of the first circuit and the second circuit 110, 120, and that is separate from these headers 1, 2, 3, 4.

The heat-transfer fluid flowing through the first circuit and the heat-transfer fluid flowing through the second circuit are not shown in the figures.

As shown in FIG. 3, each of the circuits 110, 120 comprises a plurality of chambers 6 linked fluidically to the inlet headers 1, 3 and outlet headers 2, 4 of either the first circuit 110 or the second circuit 120.

Each chamber 6 is delimited by at least two plates 7. Each plate 7 comprises a bottom wall 8 surrounded by a raised edge 9, the bottom wall 8 having one opening 10 per header 1 to 5. It can therefore be understood that said opening at least partially delimits each inlet header 1, 3, the two plates 7 being arranged one inside the other. Similarly, said opening at least partially delimits each outlet header 2, 4. Said opening also at least partially delimits the additional header 5.

The bottom walls 8 of the plates 7 delimiting the chambers 6 of the first circuit 110 or the second circuit 120 have a substantially flat overall shape, shown in particular in FIGS. 2 to 4. The heat exchanger 100 according to the invention, as shown in FIGS. 1 and 5, is therefore made up of a stack of plates 7 as described above arranged in a stacking direction substantially perpendicular to an overall main direction of extension of the bottom wall 8 of each of these plates 7. This has the effect that each of the aforementioned inlet headers 1, 3 or outlet headers 2, 4 is formed by stacking the aforementioned openings 10 formed in the bottom walls 8 of the plates 7 delimiting the chambers 6 of the first circuit 110 or of the second circuit 120. Each inlet header 1, 3 or outlet header 2, 4 for the heat-transfer fluid of the first circuit 110 or the second circuit 120 of the exchanger 100 according to the invention therefore substantially takes the form of a conduit extending through the heat exchanger 100 according to the invention.

According to a preferred although not exclusive embodiment, the openings 10 formed in the bottom walls 8 of the plates 7 that make up the heat exchanger 100 according to the invention are arranged in such a way that each of the aforementioned inlet headers 1, 3 or outlet headers 2, 4 extends substantially perpendicular to the bottom walls 8 of the plates 7 that delimit the chambers 6 of the first circuit 110 or of the second circuit 120, and therefore substantially parallel to the stacking direction of the aforementioned plates 7.

The heat exchanger 100 comprises a first group 61 of chambers and a second group 62 of chambers shown in FIG. 1, the first group 61 of chambers being separated from the second group 62 of chambers by at least one deflecting plate 11, shown in particular in FIG. 4, that is intended to force the fluid of at least the first circuit 110 or of the second circuit 120 to flow in a first flow direction in the first group 61 of chambers and to force the fluid to flow in a second flow direction in the second group 62 of chambers, as shown schematically in FIG. 5. The first and second groups 61, 62 of chambers comprise one and the same number of plates 7.

The at least one deflecting plate 11 comprises a bottom wall 8 with no opening 10 in the first inlet header 1 or the second inlet header 3, depending on the circuit intended to have a second flow direction of the fluid.

The first circuit 110 and the second circuit 120 each comprise an additional header 5.

The heat exchanger 100 may also comprise two deflecting plates 11, thus enabling a second flow direction to be provided for the fluid of the first circuit 110 and the second circuit 120.

The bottom walls 8 of the plates 7 in the first group 61 of chambers delimiting the chambers 6 of the first circuit 110 or of the second circuit 120 comprise a sealing rim 12 that surrounds each opening 10 of the second circuit 120 or the first circuit 110, as well as the openings 10 of the first outlet header 2 or of the second outlet header 4.

The bottom walls 8 of the plates 7 in the second group 62 of chambers delimiting the chambers 6 of the first circuit 110 or of the second circuit 120 comprise a sealing rim 12 that surrounds each opening 10 of the second circuit 120 or the first circuit 110, as well as the openings 10 of the first inlet header 1 or of the second inlet header 3.

The plates 7 in the first group 61 of chambers and in the second group 62 of chambers alternate between the first circuit 110 and the second circuit 120. This helps to maximize the heat exchange coefficient between the heat-transfer fluid of the first circuit 110 and the heat-transfer fluid of the second circuit 120.

Each sealing rim 12 is in contact with a second plate 7 of the second circuit 120 if the rim 12 is positioned on a plate 7 dedicated to the first circuit 110, and conversely is in contact with a second plate 7 of the first circuit 110 if the rim 12 is positioned on a plate 7 dedicated to the second circuit 120.

As shown in FIGS. 2 to 4, the first inlet header 1 and the first outlet header 2 of the first circuit 110 are arranged at one and the same first longitudinal end 13 of the heat exchanger 100. This has the advantage of circulating the heat-transfer fluid of the first circuit 110 in one and the same direction in the chambers 6 intended for the first circuit 110 in each group 61, 62 of chambers.

The second inlet header 3 and the second outlet header 4 of the second circuit 120 are arranged at a second longitudinal end 14 of the heat exchanger 100, opposite the first longitudinal end 13. This has the advantage of circulating the heat-transfer fluid of the first circuit 110 and of the second circuit 120 in one and the same group 61, 62 of chambers in opposite directions, thereby establishing a good heat exchange coefficient between the two circuits 110, 120. This also has the advantage of circulating the heat-transfer fluid of the second circuit 120 in one and the same direction in the chambers 6 intended for the second circuit 120 in each group 61, 62 of chambers.

The additional header 5 is positioned at the longitudinal end 13, 14 opposite the inlet header 1, 3 and the outlet header 2, 4 to which it is fluidically linked.

The headers 1 to 5 arranged at one and the same longitudinal end 13, 14 of the heat exchanger 100 are preferably arranged on one and the same straight line.

The inlet headers 1, 3 of the first and second circuits 110, 120 each comprise a supply channel 15, shown in FIG. 1, that is intended to supply heat-transfer fluid to the first circuit 110 or the second circuit 120 respectively.

The outlet headers 2, 4 of the first and second circuits 110, 120 each comprise an outlet channel 16, shown in FIG. 1, that is intended to drain heat-transfer fluid from the first circuit 110 or the second circuit 120 respectively.

As shown in FIG. 1, the supply channels 15 and the outlet channels 16 are positioned on one and the same face of the heat exchanger 100. This has the advantage of bringing all of the manifolds of the first and second circuits 110, 120 together on one and the same side of the heat exchanger 100, thereby reducing the size of the heat exchanger 100 and simplifying installation thereof in the vehicle.

Preferably, the openings 10 of each header 1 to 5 are of the same size. However, the invention also enables simple means not shown in the figures, such as making openings 10 of different sizes in the plates 7 in the first group 61 of chambers compared to the openings 10 in the plates 7 in the second group 62 of chambers, to be used to modify the flow rate of heat-transfer fluid inside such an exchanger 100, for an increased or reduced residence time in the first flow direction of the fluid or in the second flow direction of the fluid, thereby improving the efficiency of the heat exchange.

According to a first embodiment of the invention shown in FIGS. 2 to 5, the additional header 5 of the first circuit 110 is arranged between the second inlet header 3 and the second outlet header 4 of the second circuit 120. The additional header 5 of the second circuit 120 is arranged between the first inlet header 1 and the first outlet header 2 of the first circuit 110. This has the advantage of providing plates 7 of identical shape for each group 61, 62 of chambers, the plates 7 intended for the second circuit 120 being simply pivoted through 180° in relation to the plates of the first circuit 110 when mounted during assembly. This greatly facilitates assembly of the plates 7 and also advantageously makes it possible to reduce the number of different references and thereby reduce the tooling costs related to the construction of the heat exchanger 100. Identical shape relates to shapes having an active role in the invention, and does not apply to non-essential shapes.

According to a second embodiment of the invention not shown in the figures, as an alternative to the first embodiment, the additional header 5 of the first circuit 110 may be arranged on the extension of a straight line passing through the second inlet header 3 and the second outlet header 4 of the second circuit 120. Similarly, the additional header 5 of the second circuit 120 may be arranged on the extension of a straight line passing through the first inlet header 1 and the first outlet header 2 of the first circuit 110.

The heat-transfer fluid flowing through the first circuit 110 or the second circuit 120 may be a fluid in gas phase or liquid phase when flowing through the heat exchanger 100. The heat-transfer fluid may also be present in one chamber 6 in a phase different from another chamber 6.

According to one embodiment, the heat-transfer fluid of the first circuit 110 is a refrigerant fluid and the heat-transfer fluid of the second circuit 120 is glycol water.

According to another example embodiment, the heat-transfer fluid of the first circuit 110 and the heat-transfer fluid of the second circuit 120 may be the same fluid, but in different phases when flowing through the heat exchanger 100.

The invention also relates to use of the heat exchanger 100 described in the present document as a condenser. During such use, the first group 61 of chambers is a condensation zone for the refrigerant fluid and the second group 62 of chambers is a supercooling zone for the refrigerant fluid. In such exchangers, also known as water-cooled condensers, the refrigerant fluid is admitted in a first flow direction of the fluid of the first circuit 110 in gas form, then circulates in the second flow direction of the fluid of the first circuit 110, in contact with the different groups 61, 62 of chambers of the second circuit 120 through which the heat-transfer liquid circulates, and is gradually condensed before leaving the exchanger 100 in liquid form.

The invention claimed is:

1. A heat exchanger for a motor vehicle,
the heat exchanger comprising:
a first circuit configured to be traversed by a heat-transfer fluid,
the first circuit comprising:
a first inlet header through which the heat-transfer fluid is admitted into the first circuit, and
a first outlet header through which the heat-transfer fluid leaves the first circuit,
a second circuit configured to be traversed by a heat-transfer fluid, wherein the second circuit is fluidically separate from the first circuit and comprises:
a second inlet header through which the heat-transfer fluid is admitted into the heat exchanger, and
a second outlet header through which the heat-transfer fluid leaves the heat exchanger,
wherein the first circuit or the second circuit comprises an additional header that extends in the same direction as the inlet headers and outlet headers of the first circuit and the second circuit,
wherein the additional header is separate from the inlet and outlet headers,
wherein the first and second circuits comprise a plurality of chambers linked fluidically to the inlet headers and outlet headers of either the first circuit or the second circuit respectively,
wherein the heat exchanger comprises a first group of chambers and a second group of chambers,
wherein the first group of chambers is separated from the second group of chambers by at least one deflecting plate configured to force the fluid of at least the first circuit or the second circuit to flow in a first flow direction in the first group of chambers and to force the fluid to flow in a second flow direction in the second group of chambers,
wherein the inlet headers of the first and second circuits each comprise a supply channel configured to supply heat-transfer fluid to the first circuit or the second circuit respectively, wherein the outlet headers of the first and second circuits each comprise an outlet channel configured to drain heat-transfer fluid from the first circuit or the second circuit respectively, and wherein the supply channels and the outlet channels are positioned on a same face of the heat exchanger.

2. The heat exchanger as claimed in claim 1, wherein the at least one deflecting plate comprises a bottom wall with no opening in the first inlet header or the second inlet header, depending on the circuit configured to have a second flow direction of the fluid.

3. The heat exchanger as claimed in claim 1, wherein the first circuit and the second circuit each comprise an additional header.

4. The heat exchanger as claimed in claim 1, wherein the heat exchanger comprises two deflecting plates, and wherein the deflecting plates are configured to provide a second flow direction for the fluid of the first circuit and the second circuit.

5. The heat exchanger as claimed in claim 1, wherein the first inlet header and the first outlet header of the first circuit are arranged at a same first longitudinal end of the heat exchanger, and wherein the second inlet header and the second outlet header of the second circuit are arranged at a second longitudinal end of the heat exchanger, opposite the first longitudinal end.

6. The heat exchanger as claimed in claim 5, wherein the additional header is positioned at a longitudinal end opposite the inlet header and the outlet header to which the additional header is fluidically linked.

7. The heat exchanger as claimed in claim 1, wherein the additional header of the first circuit is arranged between the second inlet header and the second outlet header of the second circuit.

8. The heat exchanger as claimed in claim 1, wherein the additional header of the second circuit is arranged between the first inlet header and the first outlet header of the first circuit.

* * * * *